US008533500B2

(12) United States Patent
Wilmes

(10) Patent No.: US 8,533,500 B2
(45) Date of Patent: Sep. 10, 2013

(54) PROVIDING POWER TO A COMMUNICATION DEVICE VIA A DEVICE SWITCH

(75) Inventor: Edward J Wilmes, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 260 days.

(21) Appl. No.: 13/174,356

(22) Filed: Jun. 30, 2011

(65) Prior Publication Data

US 2013/0007474 A1   Jan. 3, 2013

(51) Int. Cl.
G06F 1/00 (2006.01)

(52) U.S. Cl.
USPC .......................................... 713/300

(58) Field of Classification Search
USPC ................................. 713/300, 320
See application file for complete search history.

(56) References Cited

U.S. PATENT DOCUMENTS

| 5,375,165 | A | 12/1994 | Haber et al. | |
|---|---|---|---|---|
| 7,046,234 | B2 | 5/2006 | Ozolins | |
| 7,255,503 | B2 * | 8/2007 | Grafton | 400/489 |
| 7,549,067 | B2 * | 6/2009 | Tolliver | 713/320 |
| 7,664,136 | B2 * | 2/2010 | Toebes et al. | 370/463 |
| 7,693,136 | B1 * | 4/2010 | Blair et al. | 370/352 |
| 8,106,880 | B2 * | 1/2012 | Petsche et al. | 345/156 |
| 2007/0079151 | A1 * | 4/2007 | Connor et al. | 713/300 |
| 2007/0106913 | A1 * | 5/2007 | Lewis et al. | 713/300 |
| 2008/0028237 | A1 * | 1/2008 | Knight | 713/300 |
| 2008/0168283 | A1 | 7/2008 | Penning | |
| 2008/0175227 | A1 | 7/2008 | Moore et al. | |
| 2011/0107116 | A1 * | 5/2011 | Diab et al. | 713/300 |
| 2012/0303981 | A1 * | 11/2012 | Heath et al. | 713/300 |

OTHER PUBLICATIONS 21 of the Coolest VoIP and Skype Gadgets; (Web Page).
Litetouch Keyboard; (Web Page).

* cited by examiner

Primary Examiner — Mark Connolly

(57) ABSTRACT

Example embodiments disclosed herein relate to a device switch having a connection port and a communication port. The connection port is to receive data and power via a single network cable connection from a network switch. The communication port is to pass the power from the network cable connection at the connection port to a communication device. The communication device and a data device share a numeric interface of a keyboard. The communication port is to provide power to the communication device when the data device is not powered.

15 Claims, 5 Drawing Sheets

Data Device On

Data Device Off

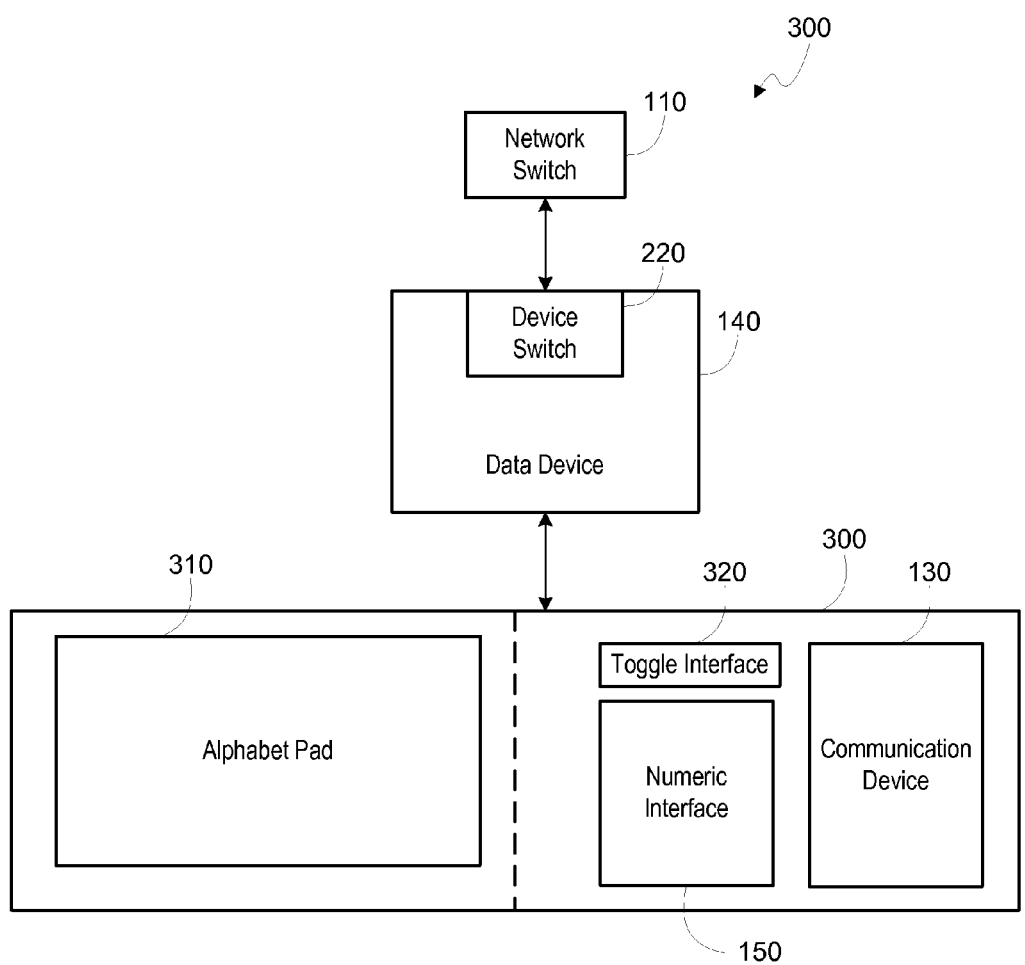

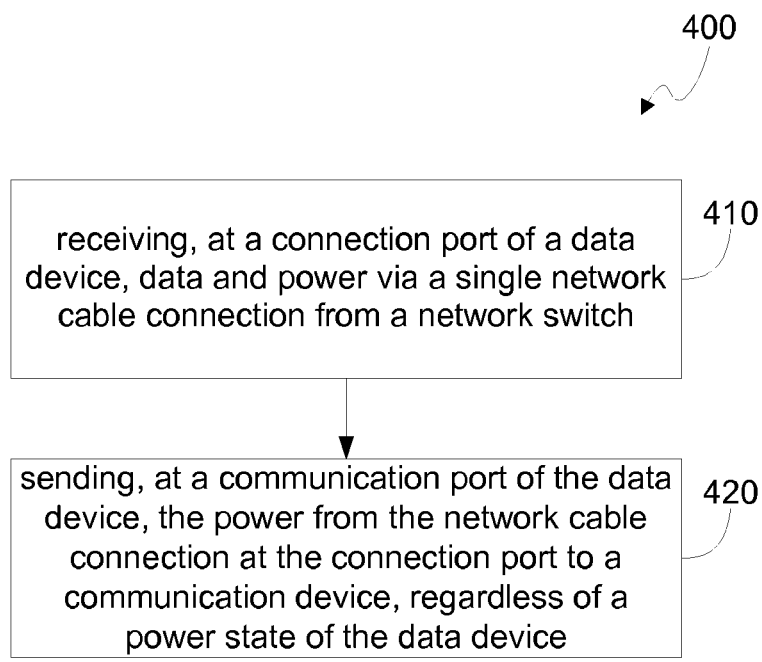

PROVIDING POWER TO A COMMUNICATION DEVICE VIA A DEVICE SWITCH

BACKGROUND

Power may be delivered to various devices over a network data cable, such as an Ethernet data cable, of a network. A user may desire to use a plurality of these various devices. Manufacturers and/or users of such networks are challenged to efficiently provide power to these various devices via the network data cable.

BRIEF DESCRIPTION OF THE DRAWINGS

The following detailed description references the drawings, wherein:

FIG. 2A is another example block diagram of a network system including a device switch when a data device is on;

FIG. 3 is yet another example block diagram of a network system including the device switch of FIGS. 2A and 2B; and FIG. 4 is an example flowchart of a method for providing power via the device switch.

DETAILED DESCRIPTION

Specific details are given in the following description to provide a thorough understanding of embodiments. However, it will be understood by one of ordinary skill in the art that embodiments may be practiced without these specific details. For example, systems may be shown in block diagrams in order not to obscure embodiments in unnecessary detail. In other instances, well-known processes, structures and techniques may be shown without unnecessary detail in order to avoid obscuring embodiments.

A user device may include, for example, a communication or data device. A data device, such as a computer, or a communication device, such as a phone, may be connected to a network switch capable of providing power or data to the user device though a network. Thus, some user devices, such as the phone, may be capable of being solely powered through the network switch. The network switch, such as an Ethernet switch, may process and route data and/or power between the network and a device switch of the user device. The device switch may process and/or route data and/or power between the network switch and the user device.

As a number of the user devices increases per user, an increased number of ports of the network switch may be used, where each of the user devices may require a separate output ports of the network switch. Some of the user devices may be combined in an attempt to use less of the ports of the network switch.

For example, the data device, such as the computer, may integrate the device switch, where an input port of device switch is connected to an output port of the network switch. Further, the communication device, such as the phone, may be implemented solely via software on the data device. Alternatively, an input port of the communication device may be physically connected to an output port of the device switch, instead of the output port of the network switch. Accordingly, a single port of the network switch may be used to operate more than one user device under either scenario, thus reducing costs. However, if the data device is powered down, the device switch will be also be powered down, resulting in the communication device being turned off too.

Embodiments may allow for a communication device to remain powered regardless of a power state of the data device, even when the communication device is to access the network switch via a device switch of the data device. Further, embodiments may have the data and communication device share at least part of a user interface, such as a keyboard, to further reduce costs and increase work space for a user.

Figure 1:
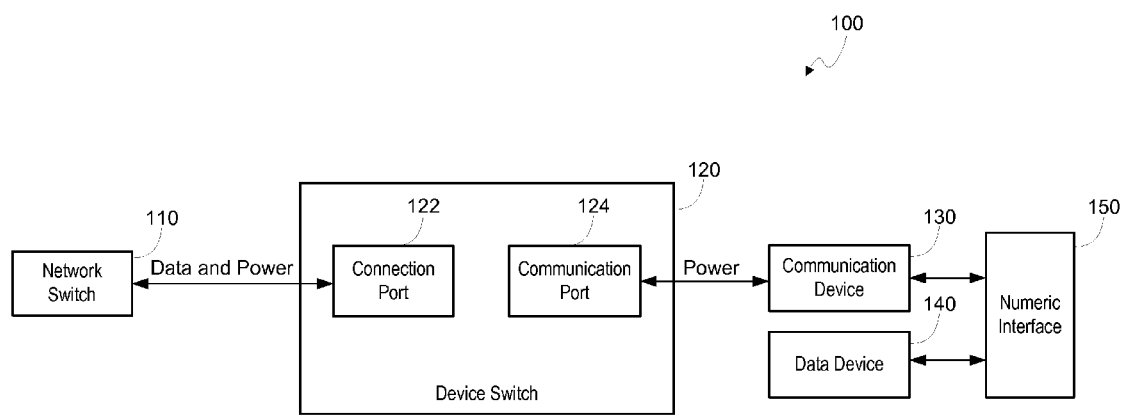
FIG. 1 is an example block diagram of a network system including a device switch.

Referring now to the drawings, FIG. 1 is an example block diagram of a network system 100 including a device switch 120. In the embodiment of FIG. 1, the network system 100 includes a network switch 110, the device switch 120, a communication device 130, a data device 140, and a numeric interface 150.

The network switch 110 may be a device connected to a network (not shown) and may process and/or route data and/or power to and/or from the network. The network 100 may include a plurality of computers and/or devices connected via communication channels to share resources, such as power, and/or information, like data.

The device switch 120 is to interface with the network switch 110 via a single network connection. For example, a first end or plug of a single network cable may connect to an output port or jack of the network switch 110 and a second end or plug of the single network cable may connect to an input port or jack of the device switch 120.

The network cable may transmit power in addition to data. When the network cable is an Ethernet cable, an overall scheme for providing the power and data over the network cable may be referred to as Power over Ethernet (PoE). Further, the network switch 110 may be, for example, a closet PoE switch and the device switch 120 may be, for example, a PoE pass-though switch or chipset. However, embodiments are not limited to Ethernet cables and may include various other types of network cables.

The device switch 120 may process and/or route data and/or power between the network switch 110 and at least the communication device 130. As shown in FIG. 1, the device switch 120 includes a connection port 122 and a communication port 124. The connection port 122 is to receive and/or transmit the data and power via the single network cable connection from the network switch 110. The communication port 124 is to pass the power from the network cable connection at the connection port 122 to the communication device 130. Thus, the device switch 120 may be a pass-through switch, such as a POE pass-through switch, that passes the power transmitted along the network cable connection from the network switch 110 to the communication device 130.

The communication device 130 may be any type of device capable of transmitting and receiving sound, such as a user's voice. For example, the communication device 120 may be any type of analog phone, digital phone, Voice over Internet Protocol (VoIP) phone, mobile phone, a computing device have a phone or phone-like capabilities, and the like.

The data device 140 may be a computing device and/or a docking station. Examples of a computing device include a chip set, a desktop computer, a workstation, a notebook computer, a slate computing device, a portable reading device, a wireless email device, or any other device capable of transmitting and/or receiving the data. The docking station may be any type of device that allows for a main device capable of sending and/or transmitting data, such as a notebook computer, to connect to a peripheral component, such as a mouse, a keyboard, a display, a network switch, a power switch, etc.

The numeric interface 150 may include one or more number interfaces, representing numbers, and be part of a keyboard. For example, the numeric interface 150 may be a keypad or a touchscreen, where the touchscreen displays numeric keys. As shown in FIG. 1, the communication device 130 and the data device 140 may share the numeric interface 150, as explained in greater detail below with respect to FIG. 3.

While, the device switch 120 is shown to be external of the data device 140, the device switch 120 may also be integrated within the data device 140. Accordingly, the device switch 120 may be powered by the data device 140. However, the device switch 120 may also be self-powered, such as by the power received over the network connection cable. Thus, the communication port 124 of the device switch 120 may pass the power received at the connection port 122 on to the communication device 130, even when the data device 140 is not powered. Hence, the communication device 130 may remain powered regardless of a power state of the data device 140, even when the communication device 130 connects to the network cable connection via the data device 140.

Figure 2A:
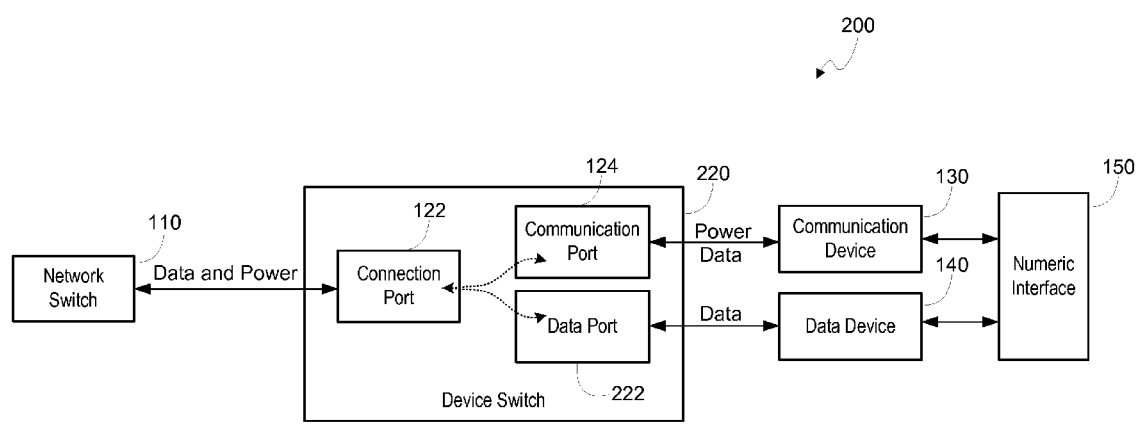
Figure 2B:
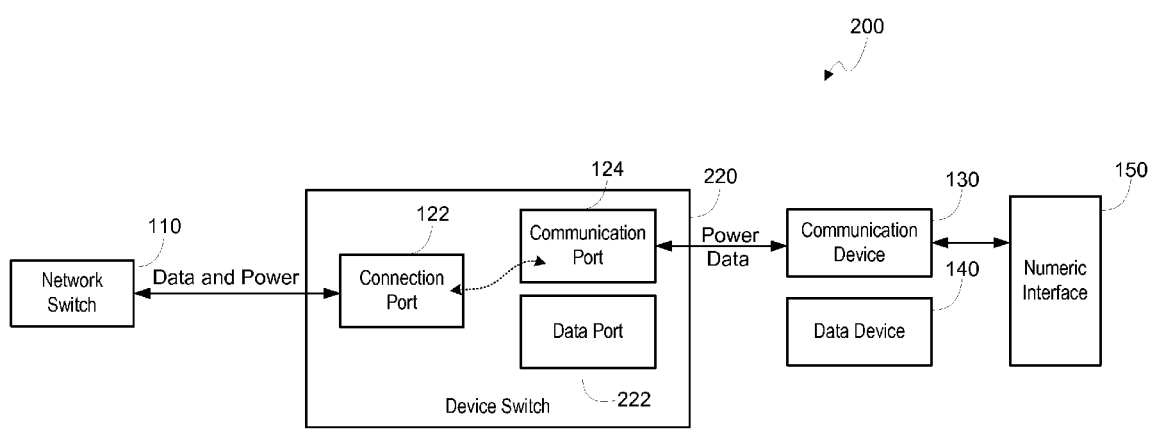
FIG. 2B is an example block diagram of the network system of FIG. 2A when the data device is off.

FIG. 2A is another example block diagram of a network system 200 including a device switch 220 when the data device 140 is on. FIG. 2B is an example block diagram of the network system 200 of FIG. 2A when the data device 140 is off. In this embodiment, the network system 200 is similar to the network system 100 of FIG. 1, except the device switch 220 also includes a data port 222. As shown in FIG. 2A, the data port 222 is to pass the data between the connection port 122 and the data device 140, when the data device 140 is powered on. However, as shown in FIG. 2B, the data port 222 is to not pass the data between the connection port and the data device 140, when the data device 140 is powered off.

Further, as shown in FIGS. 2A and 2B, the communication port 124 is to pass data between the connection port 122 and the communication device 130, regardless of a power state of the data device 140. Thus, the data port 222 is only active when the data device 140 is powered on and data port 222 may only transmit and/or receive the data. Yet, the communication port 124 is active regardless of a power state of the data device 140 and the communication port 124 may transmit and/or receive both the data and the power.

FIG. 3 is yet another example block diagram of a network system 300 including the device switch 220 of FIGS. 2A and 2B. In this embodiment, the network system 300 is similar to the network system 200 of FIGS. 2A and 2B, except the device switch 220 is shown to be integrated within the data device 140. Further, communication device 130 and the numeric interface 150 are shown to be integrated within a keyboard 300. In FIG. 1, the keyboard 300 further includes an alphabet pad 310 and a toggle interface 320. The alphabet pad 310 may, for example, include one or more buttons or a touchscreen displaying one or more buttons, representing alphabetical letters.

The toggle interface 320 is to toggle use of the numeric interface 150 of the keyboard 300 between the data device 140 and the communication device 130. The toggle interface 320 may be any type of device known in the art for selecting between two states. For example, the toggle interface 320 may be an electromechanical device, such as a switch, a touch pad, a soft key, etc. Alternatively, the toggle interface may be implemented as software stored on the communication and/or data device 130 and 140.

In one embodiment, the numeric interface 150 is to be only usable by the data device 140 when the toggle interface 320 is at a first state or position, and the numeric interface 150 is to be only usable by the communication device 130 when the toggle interface 320 is at a second state or position. Accordingly, the numeric interface 150 may be shared by both the data and communication devices 140 and 130, with the toggle interface 320 to determine which of the data and communication devices 140 and 130 is to interface with the numeric interface 150 at a given time.

For example, during a first instance, a user may be entering numeric data into the data device 140, such as into a spreadsheet application, using the numeric interface 150. Therefore, the user may currently have the toggle interface 320 at the first position. However, during a second instance, the user may change the toggle interface 320 to the second position in order to use the numeric interface 150 to place a call using the communication device 130. Thus, costs may be reduced and work space may be increased by the data and communication devices 140 and 130 sharing the numeric interface 150.

Further, embodiments of the data and communication devices 140 and 130 may also share one or more other types of interfaces based on one or more toggle interfaces. For example, the same toggle interface 320 or a different toggle interface may be used to toggle use of the alphabet pad 310 between the data and communication devices 140 and 130.

In one embodiment, as shown by the dotted line across the keyboard 300, a right side of the keyboard 300 including the numeric interface 150, the toggle interface 320 and the communication device 130, may be separable or detachable from a left side of the keyboard 300 including the alphabet pad 310. However, embodiments of the keyboard 300 may include various separable or non-separable configurations.

Also, the communication device 130 may include one or more of the following components (which are not shown): a voice/video processor; an audio codec module; a video codec module; a jack, USB hub and/or Bluetooth transceiver for a headset or handset; an Ethernet transceiver to interface with the communication port 124; a clock; a speakerphone; a video decoder; a Video Digital to Analog Conversion (DAC) component; a touch screen; a touch screen controller to support the touch screen; and/or a keyboard.

In one embodiment, the communication device 130 may be a mobile phone that docks to a mobile docking station (not shown). The mobile docking station may be integrated into or separate from the keyboard 300 and may interface with the communication port 124. When the mobile device is docked, the mobile device may be powered, receive/place calls, and/or send/transmit data through the network cable connection via the communication port 124.

FIG. 4 is an example flowchart of a method 400 for providing power via the device switch 220. Although execution of method 200 is described below with reference to the device switch 220, other suitable switches, such as the device switch 120 of FIG. 1, may be also be utilized.

In FIG. 4, at block 410, the connection port 122 of the device switch 220 receives data and power via a single network cable connection from the network switch 110. Then, at block 420, the communication port 124 of the device switch 220 sends the power from the network cable connection at the connection port 122 to the communication device 130, regardless of a power state of the data device 140. The communication and data devices 130 and 140 share a numeric interface 150 of the keyboard 300.

As explained above, a user may toggle a use of the numeric interface 150 between the communication and data devices 130 and 140 based on the toggle interface 320. The numeric interface 150 is used only for the data device 140 when the toggle interface 320 is at the first position and the numeric interface 150 is used only for the communication device 130 when the toggle interface 320 is at the second position.

The communication port 124 of the device switch 220 sends the data and/or power from the network cable connection at the connection port 122 to the communication device 130 regardless of the power state of the data device 140. The data port 222 of the device switch 220 sends the data between the connection port 122 and the data device 140 when the data device 140 is in an on state of the power state. The data port 222 of the data device 220 does not send the data between the connection port 122 and the data device 140 when the data device 140 is in an off state of the power state.

With the above approaches, a communication device may remain powered regardless of a power state of the data device, even when the communication device is to access the network switch via a device switch of the data device. Further, the data and communication device may share at least part of a user interface, such as a keyboard, to further reduce costs and increase work space for the user.

What is claimed is:

1. A system comprising:
communication device to send and receive sound; and
a data device to send and receive data, the data device having a device switch that includes,
a connection port to receive data and power via a single network cable connection from a network switch, and
a communication port to pass the power from the network cable connection at the connection port to the communication device, wherein
the communication device connects to the cable connection via the data device,
the communication device and the data device share a numeric interface of a keyboard, and
the communication port is to provide the power to the communication device when the data device is not powered.

2. The system of claim 1, wherein the keyboard includes a toggle interface to toggle use of the numeric interface of the keyboard between the data device and the communication device.

3. The system of claim 2, wherein,
the numeric interface is only usable by the data device when the toggle interface is at a first position, and
the numeric interface is only usable by the communication device when the toggle interface is at a second position.

4. The system of claim 1, wherein the device switch further includes a data port to pass data between the connection port and the data device, wherein
the communication port, is to further pass data between the connection port and the communication device.

5. The device switch system of claim 4, wherein,
the data port is to not pass the data between the connection port and the data device when the data device is off, and
the communication port is to pass the data between the connection port and the communication device when the data device is on.

6. The system of claim 1, wherein the numeric interface is at least one of a keypad and a touchscreen, the touchscreen to display numeric keys.

7. The system of claim 1, wherein the communication device is at least one of an analog phone, a digital phone, a mobile phone, and a Voice over Internet Protocol (VoIP) phone.

8. The system of claim 1, wherein the data device is at least one of a desktop computer and a docking station.

9. The system of claim 1, wherein the numeric interface is separable from the keyboard.

10. The system of claim 1, wherein the network cable connection is a Power-over-Ethernet (PoE) connection.

11. A method for providing power via a device switch included within a data device, comprising:
receiving, at a connection port of the device switch, data and power via a single network cable connection from a network switch; and
sending, at a communication port of the device switch, the power from the network cable connection at the connection port to a communication device, regardless of a power state of the data device, wherein
the communication device and the data device share a numeric interface of a keyboard, and
the communication device connects to the cable connection via the data device.

12. The method of claim 11, further comprising:
toggling a use of the numeric interface between the communication and data devices based on a toggle interlace;
using the numeric interface only for the data device when the toggle interface is at a first position; and
using the numeric interface only for the communication device when the toggle in is at a second position.

13. The method of claim 11, further comprising:
sending, at the communication port of the device switch, data from the network cable connection at the connection port to a communication device regardless of the power state of the data device.

14. The method of claim 13, further comprising:
sending, at a data port of the device switch, data between the connection port and the data device when the data device is in an on state of the power state, and
not sending, at a data port of the device switch, the data between the connection port and the data device when the data device is in an off state of the power state.

15. A data device comprising:
a device switch including,
a connection port to receive data and power via a single network cable connection from a network switch, and
a communication port to pass the power from the network cable connection at the connection port to a communication device, wherein
the data device shares a numeric interface of a keyboard with the communication device, and
the communication port is to provide the power to the communication device when the data device is not powered.

* * * * *

UNITED STATES PATENT AND TRADEMARK OFFICE
CERTIFICATE OF CORRECTION

| | |
|---|---|
| PATENT NO. | : 8,533,500 B2 |
| APPLICATION NO. | : 13/174356 |
| DATED | : September 10, 2013 |
| INVENTOR(S) | : Edward J Wilmes |

It is certified that error appears in the above-identified patent and that said Letters Patent is hereby corrected as shown below:

In the Claims:

In column 5, line 18, in Claim 1, before "communication" insert -- a --.

In column 5, line 45, in Claim 4, delete "port," and insert -- port --, therefor.

In column 5, line 47, in Claim 5, before "system" delete "device switch".

In column 6, line 26, in Claim 12, delete "interlace;" and insert -- interface; --, therefor.

In column 6, line 30, in Claim 12, delete "in" and insert -- interface --, therefor.

Signed and Sealed this
Fifth Day of November, 2013

Teresa Stanek Rea
*Deputy Director of the United States Patent and Trademark Office*